Feb. 11, 1969

H. J. KIRCHER III, ETAL 3,426,529

TANK CONSTRUCTION FOR JET ENGINE

Filed March 2, 1966

INVENTORS
HARTMANN J. KIRCHER, III
JAMES A ROSSETTO
BY

*Curtis, Morris & Safford*

ATTORNEYS

INVENTORS
HARTMANN J. KIRCHER, III
JAMES A. ROSSETTO
BY
*Curtis, Morris & Safford*
ATTORNEYS

United States Patent Office 3,426,529
Patented Feb. 11, 1969

3,426,529
TANK CONSTRUCTION FOR JET ENGINE
Hartmann J. Kircher III, Sparta, N.J., and James A. Rossetto, Orlando, Fla., assignors to Thiokol Chemical Corporation, Bristol, Pa., a corporation of Delaware
Filed Mar. 2, 1966, Ser. No. 531,173
U.S. Cl. 60—39.48          7 Claims
Int. Cl. F02k 9/02

ABSTRACT OF THE DISCLOSURE

Disclosure is directed to a cylindrical tank construction for a rocket engine having partitions forming concentric chambers with the inner space divided into separate chambers along the axis and a passageway for flow between the outer chamber and forward inner chamber having a check valve. In the illustrated embodiment the tank is divided by a transverse partition to provide inner and outer chambers for separate liquid propellants.

---

The present invention relates to rocket motors and more particularly to a tank structure in a rocket motor for storing and dispensing liquids such as propellant fuels and oxidizers.

Rocket motors usually are propelled and accelerated in a desired path by the thrust of a jet of combustion products burned in a combustion chamber in the motor. Usually the thrust is applied in a plurality of sequential operating periods with glide periods between the successive periods of applied thrust. In other words, the rocket engine has successive firing and shut-down periods. It is necessary, therefore, to store the propellant fuel and oxidizer required to produce such successive periods of thrust.

At low accelerations of the rocket motor the liquid fuel and oxidizer are apt to move and "slosh around" in the fuel and oxidizer containers since at low acceleration there is essentially no force to keep the propellants in the desired location and hence almost any disturbing force will cause the propellants to move to a different location.

When the oxidizer and fuel are not in the desired location, the mass distribution within the rocket is not correct and during successive firing periods torques are produced which affect the flight path of the motor. Incorrect positioning of the fuel and oxidizer also presents an additional problem of distribution in that the liquids are not in a position from which they can be discharged into the passages that transfer the liquids to the combustion chamber where the liquids are burned.

One of the objects of the present invention is to provide a tank structure in a rocket motor which will maintain the center of mass of the liquid propellant at a particular axis of the rocket motor during practically all conditions of operation.

Another object is to provide a tank construction in a rocket motor which permits restarts of the motor under practically all accelerations including zero net accelerations, and the delivery of the liquid fuel and oxidizer without any substantial change in the position of the center of mass with respect to the axis of the motor.

Still another object is to provide a tank construction in a rocket vehicle which is of relatively simple and compact construction, economical to manufacture and one which is reliable in operation in performing its intended function.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

Figure 1:
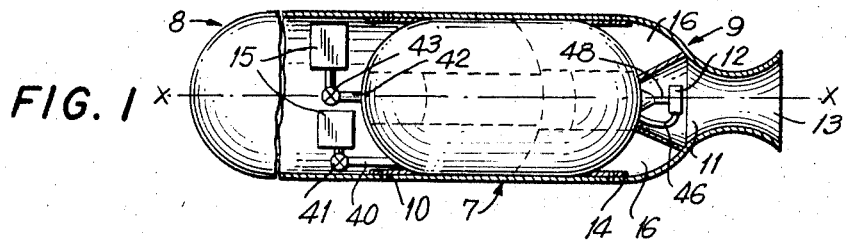
FIGURE 1 is a side elevational view of a rocket motor incorporating the novel tank structure of the present invention.
Figure 2:
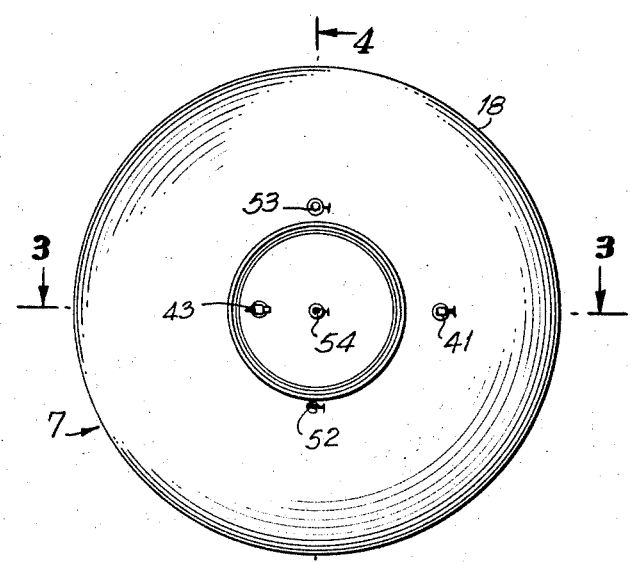
FIGURE 2 is a front elevational view of the tank showing the ports for filling the forward section of the tank with a liquid oxidizer and supplying a motive fluid thereto as well as vent connections to permit the fluid to flow into and out of the tank.

The rocket motor in which the tank construction of the present invention is used may have many different shapes and forms. For purposes of illustration a rocket motor 6 is shown in FIGURE 1 in which the cylindrical tank 7 of the present invention constitutes an intermediate section with a forward section 8 attached to one end and an aft section 9 attached to the opposite end thereof. The forward section 8 could be another rocket motor or could be a capsule carrying the payload. In either case, the forward section is attached to a flange 10, or other structure, at the forward end of the tank. The aft section 9 in the illustrated embodiment incorporates a combustion chamber 11 having a propellant injector 12 therein and a nozzle 13, and the aft section also is connected to a flange 14 or other fitting at the rear of the tank section 7. The forward section 8 has vessels 15 therein and the aft section has vessels 16 containing a pressurized motive fluid, such as helium, for forcing a liquid from the tank section 7, as later explained in more detail.

In accordance with the present invention, the tank section 7 constituting the intermediate section of the rocket motor 6 is constructed to maintain separate quantities of liquid fuel and oxidizer, corresponding to those needed for successive firings, concentric to the axis of the motor and cause the liquids to flow radially inward to successive chambers to at all times maintain the center of mass of the liquid fuel and oxidizer substantially on the longitudinal axis of the motor.

Figure 3:
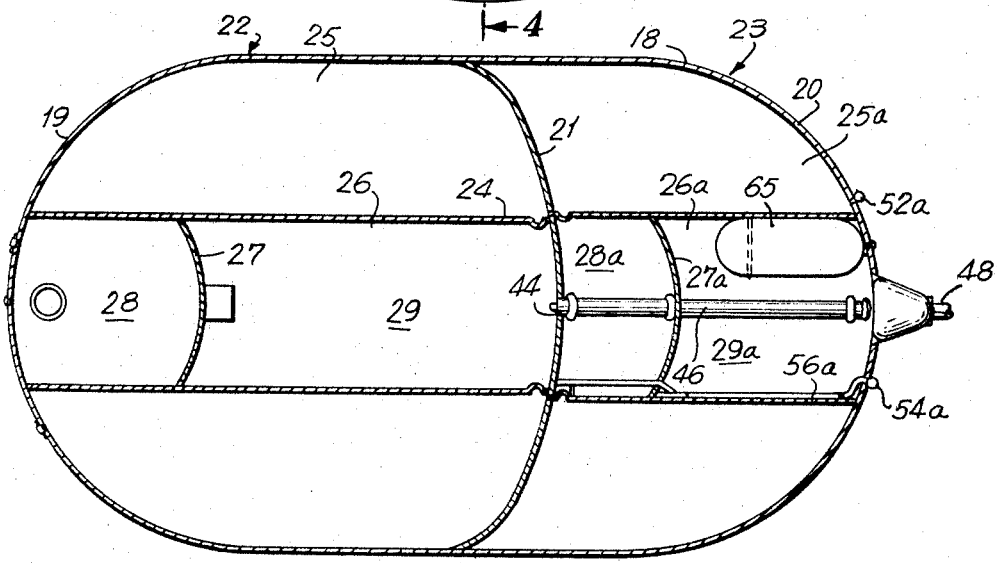
FIGURE 3 is a sectional view of the tank structure taken on line 3—3 of FIGURE 2 and showing the bulkhead dividing the tank into sections and the partition walls dividing the sections into concentric chambers.

The tank section 7 has a cylindrical wall 18 and ends 19 and 20 to form a closed vessel, see FIGURE 3. The cylindrical wall 18 and ends 19 and 20 are symmetrical about a central axis which, in turn, is coincidental with the longitudinal axis $x$—$x$ of the rocket motor 6. The tank section 7 may be constructed to contain a single liquid, or a plurality of liquids, such as the particular fuels and oxidizers to be used in a particular rocket motor. In the illustrated embodiment, the tank section 7 is divided by a transverse bulkhead 21 dished rearwardly to provide a concave surface along which a liquid is caused to flow radially inward as moves rearwardly in the tank, as viewed in FIGURE 3. The transverse bulkhead 21 divides the tank section 7 into a forward section 22 for containing a liquid oxidizer, such as nitrogen tetraoxide, and an aft section 23 for containing a propellant fuel, such as hydrazine.

Figure 4:
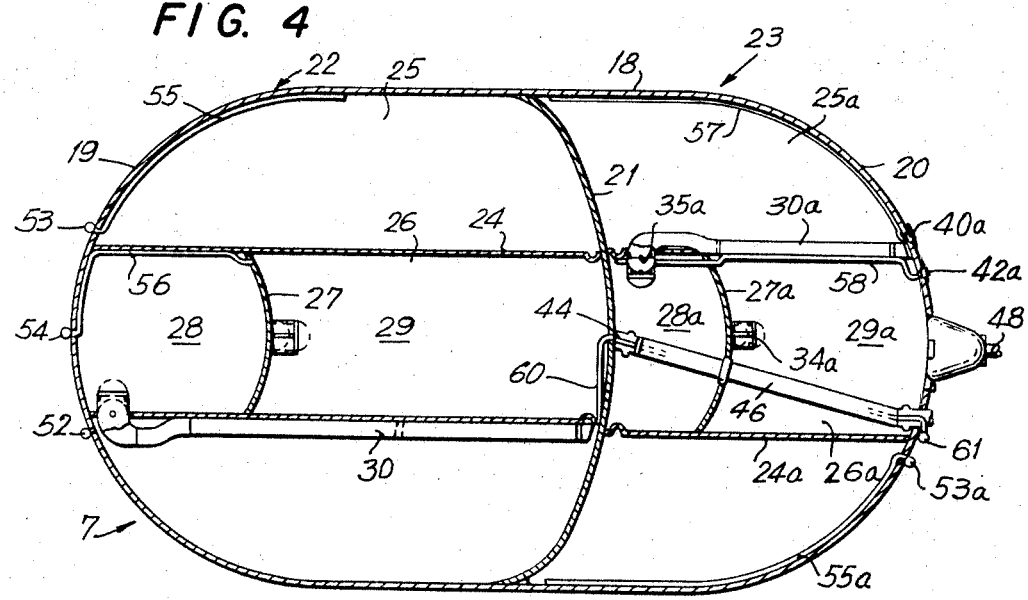
FIGURE 4 is a sectional view taken on line 4—4 of FIGURE 2 and showing the passages connecting the outer and inner chambers at the forward and rearward sections of the tank.
Figure 5:
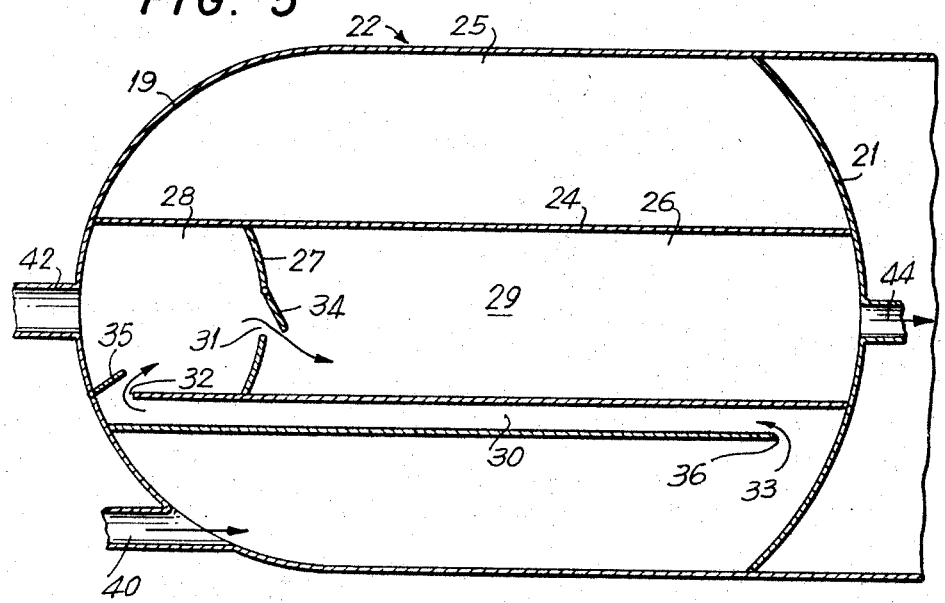
FIGURE 5 is an enlarged sectional view of the forward section of the tank and showing the relationship of the chambers and compartments in the tank and the check valves in the connecting passageways.

For the purpose of description, the forward section 22, as shown in detail in FIGURE 5, may be considered as a complete unitary tank for containing a single liquid. This tank section 22 has a cylindrical inner wall 24, not shown in FIGURE 5, concentric with the cylindrical inner wall 18 and axis $x—x$ of the motor, see FIGURE 1, to divide the section into separate concentric chambers 25 and 26. The inner chamber 26, as shown in FIGURES 4 and 5, also has a transverse wal 27 dished rearwardly to divide the inner chamber into a small compartment 28 at its forward end and a larger compartment 29 rearwardly of the small compartment.

The outer and inner chambers 25 and 26 in the forward section 22 are connected to each other by a passage 30, see FIGURES 4 and 5, through which the liquid can flow inwardly from the outer to the inner chamber. Transverse wall 27 also has a port 31 through which the liquid can flow from the compartment 28 to the compartment 29. Passage 30 is in the form of a tube having its forward end attached to the hemispherical end 19 and underlying a port 32 in wall 24 for communication with the forward compartment 28. The rearward end of the tube forming the passage 30 is open and spaced from the bulkhead 21 to provide a port 33 between its end and the rearwardly curved bulkhead 21. Check valves 34 and 35 are provided in each of the ports 31 and 32 to permit flow of liquid from chamber 25 into compartment 28 of chamber 26 and from compartment 28 to compartment 29, but prevent the flow of liquid in the opposite direction. These check valves are illustrated in FIGURE 5 as conventional flap valves, but it will be understood that any conventional type of check valve may be used such as those having a ball mounted for movement toward and away from a seat.

Chamber 25 has a connection 40 to vessel 15 containing a pressurized motor fluid such as helium, see FIGURE 1, and the connection has a valve 41. Compartment 28 of chamber 26 also has a connection 42 to the same or another vessel 15 in the forward section 8 of the rocket motor and the connection has a valve 43 therein. The opposite or rearward end of the inner chamber 26 has an outlet passage 44 coincidental with the axis of the cylindrical tank section 7. Thus, when motive fluid, such as helium under pressure, is admitted through the apssage 40 into the chamber 25, it will force the liquid rearwardly through the chamber, port 33 into passage 30 and through the port 32 and check valve 35 into the compartment 28. This movement of the liquid displaces the liquid in the compartment 28 which then moves rearwardly through the port 31 and check valve 34 into compartment 29 of the inner chamber 26. Thus, the liquid moves radially inward from chamber 25 into chamber 26 and is maintained in a solid slug substantially concentric to the axis $x—x$ during such movement. After the fluid has been transferred from the outer chamber 25 radially inwardly to the inner chamber 26, check valves 34 and 35 prevent reverse flow from the inner chamber 26 to the outer chamber 25 and also prevent reverse flow from the compartment 29 to compartment 28.

The aft section 23 of the tank 7 is substantially identical with the forward section in that it has an inner wall 24a dividing the section into an outer chamber 25a and an inner chamber 26a, see FIGURES 3 and 4. The inner chamber 26a has a transverse wall 27a dividing it into a forward compartment 28a and a rearward compartment 29a. A tube 30a connects the outer chamber 25a to the inner chamber 26a and has an open end adjacent the end 22 which curves upwardly longitudinally of the tank. The opposite end of the tube 30a enters the compartment 28a and the passage formed by the tube 30a is controlled by check valves 34a and 35a like valves 34 and 35 previously described.

As shown in FIGURES 3 and 4, the outlet 44 from the rear of the compartment 29 of the inner chamber 26 is connected by a conduit 46 to the exterior of the hemispherical end bell 20 and this conduit is connected to the peripheral ring portion or injector 12, see FIGURE 1, to supply oxidizer thereto. Extending axially from the center compartment 29a is a conduit 48 connecting the compartment to the injector 12 to supply fuel thereto. Each of the conduits 46 and 48 has a valve which controls flow to the injector 12. A suitable igniter may be provided, but when an oxidizer, such as nitrogen tetraoxide, and a fuel, such as hydrazine, are used, they will ignite spontaneously when brought into contact.

The outer chambers 25 and 25a have filling ports 52 and 52a, see FIGURES 3 and 4, through which the liquid is supplied to the tanks. Each of these ports 52 and 52a has a valve, not shown, for opening and closing the ports and has a fitting for connection to a suitable hose. Also each of the chambers 25, 26 and 25a, 26a, has vent ports 53, 54 and 53a, 54a in the ends 19 and 20 of the tank 7, as shown in FIGURES 3 and 4, and these vent ports are connected by tubes 55, 56 and 55a, 56a to the periphery of the ends 19 and 20. It will be noted that vent tubes 55a and 56a are arranged at diammetrically opposed sides of the tank section 7 so that the forward and rearward sections would be filled successively. The chambers 25a and 26a of the aft tank section 23 have ports 40a and 42a for supplying a pressurized motive fluid and the ports have tubes 57 and 58 extending forwardly to the forward ends of the chambers adjacent the bulkhead 21.

Liquids in the inner and outer chambers 25 and 26 of the tank section 7 also can be drained therefrom through drain ports, for example, port 60 shown in FIGURE 4, having a depending leg extending to a position adjacent the cylindrical wall 24 in compartment 29 through the conduit 46 and provided with an outlet port 61. Thus, by opening the outlet port 61 and the vent port 53, liquid can be drained from the forward section. Similar drain ports are also provided in the rearward section for this purpose. A tank 65 also is shown in FIGURE 3 which contains a liquified gas used to control the attitude and roll of the motor through suitable jets. One form of the invention having been described in detail, the mode of operation is now explained.

Assuming for purposes of description that all of the chambers 25, 26 and 25a and 26a of the intermediate tank section 7 are filled with liquid oxidizer and fuel and that all of the ports are closed. When the rocket motor is to be started up, the valves 41 and 43 in the passage 40 and 42, see FIGURES 1, 4 and 5, are opened to supply a motive fluid such as helium, to the forward end of the outer chambers 25 and 25a. When valves in the outlet conduits 46 and 48 are opened, the motor fluid at the front of the annular chambers 25 and 25a forces the oxidizer and fuel rearwardly which then flows through the passage 30 and 30a into the compartments 28 and 28a of the inner chambers 26 and 26a. These liquids then displace the oxidizer and fuel in compartments 28, 28a and 29, 29a which flow to the injector 12 and are ignited and burned when self-igniting materials are used. At the completion of a firing cycle all of the oxidizer and fuel will have been removed from the outer chambers 25 and 25a and, due to the acceleration, the momentum of the liquid mass will tend to move it rearwardly as an annular column and force it upwardly along the curved bulkhead 21 and end wall 20 into ports 33 and 33a of the passageway 30 and 30a.

The volume of the chambers 25 and 25a are designed to provide the amount of oxidizer and of fuel required during a firing cycle to attain a particular desired acceleration and velocity of the rocket motor. When this velocity is attained, the valves in conduits 46 and 48 to the injector 12 close to shut off the supply of liquids thereto. The rocket engine then goes through a coasting cycle during which time the check valves 34 and 35 and corresponding check valves in the fuel system prevent any reverse flow of liquid from the inner chambers 26 and 26a into outer chambers 25 and 25a. Furthermore, the relatively small compartments 28 and 28a in the inner chambers 26 and 26a provide for variation from a minimum to a maximum amount of oxidizer and fuel movement during a firing cycle. When the rocket motor 6 is fired for a minimum period of time all of the liquid propellant in the outer chambers 25 and 25a will have been transferred to completely fill compartments 28, 28a and 29, 29a. When the motor 6 is fired for a maximum period of time substantially all of the liquid propellant in the compartments 28 and 28a will have been transferred into the rearward compartments 29 and 29a.

Following a coast cycle, another firing cycle is started by opening valves in conduits 46 and 48 for oxidizer and fuel and in conduits 40 and 42 for supplying a motive fluid to the forward compartments 28 and 28a in the inner chamber 26. Motive fluid then acts like a ram on the column of liquid in the inner chambers 26 and 26a, respectively, and forces the liquid through the outlet conduits 46 and 48 to the injector 12. The firing cycle then continues until all of the oxidizer and fuel have been dispensed from the tank.

It will now be observed that the present invention provides a tank structure in a rocket motor which maintains the center of mass of liquid propellants substantially constant at the longitudinal axis of the vehicle during all conditions of operations. It also will be observed that the present invention provides a tank construction in a rocket engine which permits starting the motor under conditions of "weightlessness" in space without disturbing the center of mass at the longitudinal axis of the vehicle. It will also be observed that the present invention provides a tank construction in a rocket motor which may be easily and quickly filled with and drained of liquid. It will also be observed that the present invention provides a tank construction in a rocket engine which is of relatively simple and compact construction, economical to manufacture and one which is reliable in operation to perform its intended function.

While a single embodiment of the invention is herein illustrated and described, it will be understood that changes may be made in the construction and arrangement of elements without departing from the spirit or scope of the invention. The chambers 25 and 26 and 25a and 26a could contain a plurality of compartments and check valves depending on the desired number of firing cycles. Therefore, without limitation in this respect, the invention is defined by the following claims.

We claim:

1. In a rocket motor, a tank structure for storing liquid comprising a vessel having a generally cylindrical outer wall, at least one cylindrical partition wall in the vessel to divide the space into concentric chambers, a passageway between said concentric chambers having a one way check valve therein which opens in response to an increase in pressure in the outer chamber to permit flow radially inward from the outer to the inner chamber and closes upon a decrease in pressure in the outer chamber to prevent flow in the opposite direction, an inlet to the outer chamber, an outlet from one end of the inner chamber, and means for supplying a motive fluid through the inlet to the outermost chamber at a pressure greater than the pressure in either chamber to cause the fluid in the outermost chamber to flow radially inward from the outer to the inner chamber and discharge through the outlet from the inner chamber whereby to maintain the bulk of liquid therein concentric to the axis of the rocket motor for most operating conditions.

2. A rocket motor in accordance with claim 1 in which a transverse partition is provided in the inner chamber to divide it into separate compartments, and passages between the compartments having a check valve therein.

3. A rocket motor having a tank structure for storing liquid fuel and an oxidizer comprising a generally cylindrical vessel having a diaphragm dividing it into separate adjacent sections along its axis, a cylindrical partition wall in each cylindrical section to divide the space in each section into concentric chambers, passageways between said concentric chambers in each section and having check valves therein to permit flow radially inward from the outer to the inner chambers and prevent flow in the opposite direction, an outlet from one end of each inner chamber, and means for producing a force on said fluid in the outermost chamber of each section to cause it to flow radially inward from the outer to the inner chambers, successively, whereby to maintain the center of mass of the fluids concentric to the axis of the rocket motor for most operating conditions.

4. A rocket motor in accordance with claim 2 in which the means for porducing a force on said fluid in the outermost chamber is a high pressure gas which acts as a pneumatic ram to force the liquid longitudinally of the chamber whereby to maintain its center of mass concentric to the axis of the tank as it flows from the outer to the inner chamber.

5. A rocket motor in accordance with claim 3 in which the inner chamber has a transverse wall to divide it into separate compartments, a passageway in said transverse wall, and a check valve in said passageway to permit flow toward the outlet and prevent flow in the opposite direction whereby to maintain the flow of the liquid in the inner chamber concentric to the axis of the rocket motor.

6. A rocket motor in accordance with claim 3 in which a burner is provided at the exterior of the tank structure and conduits connecting the rearward compartment of each inner chamber to the burner.

7. A rocket motor in accordance with claim 3 in which the outer chamber of each section has a filling port, the inner chamber of each section having a drain port, each outer and inner chamber having a vent port, said ports being located at the exterior of the tank, and valves for opening and closing the filling, draining and vent ports.

References Cited

UNITED STATES PATENTS

| 2,526,221 | 10/1950 | Goddard | 222—399 |
| 3,300,981 | 1/1967 | Porter | 60—39.48 |
| 3,310,938 | 3/1967 | Samms | 60—39.48 |

MARTIN P. SCHWADRON, *Primary Examiner.*

DOUGLAS HART, *Assistant Examiner.*

U.S. Cl. X.R.

60—259